US012523691B2

(12) United States Patent
Hikita

(10) Patent No.: US 12,523,691 B2
(45) Date of Patent: Jan. 13, 2026

(54) SYSTEM AND METHOD FOR SENSING FAULT SYMPTOM BEFORE OCCURRENCE OF FAULT UTILIZING NEURAL NETWORK MODEL

(71) Applicant: Mitsubishi Electric Corporation, Tokyo (JP)

(72) Inventor: Takeo Hikita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 763 days.

(21) Appl. No.: 17/525,127

(22) Filed: Nov. 12, 2021

(65) Prior Publication Data

US 2022/0170975 A1  Jun. 2, 2022

(30) Foreign Application Priority Data

Nov. 27, 2020 (JP) .................................. 2020-197204

(51) Int. Cl.
*G01R 31/08* (2020.01)
*G06N 3/08* (2023.01)
(Continued)

(52) U.S. Cl.
CPC ............. *G01R 31/085* (2013.01); *G06N 3/08* (2013.01); *G06N 5/046* (2013.01); *H02H 1/0007* (2013.01)

(58) Field of Classification Search
CPC ........ G01R 31/085; G06N 3/08; G06N 5/046; H02H 1/0007
See application file for complete search history.

(56) References Cited

U.S. PATENT DOCUMENTS 5,537,327 A * 7/1996 Snow ................... H02H 1/0015
706/45
5,783,946 A * 7/1998 Yang ................... H02H 1/0092
702/58
(Continued)

FOREIGN PATENT DOCUMENTS

JP    H11142466 A    5/1999
JP    2915106 B2    7/1999
(Continued)

OTHER PUBLICATIONS

Notice of Reasons for Refusal dated Jun. 4, 2024, issued in the corresponding Japanese Patent Application No. 2020-197204, 10 pages including 5 pages of English Translation.

*Primary Examiner* — Lisa M Caputo
*Assistant Examiner* — Sharah Zaab
(74) *Attorney, Agent, or Firm* — Buchanan Ingersoll & Rooney PC

(57) ABSTRACT

A fault symptom sensing system comprises a slave station including an inference device to infer whether a fault symptom occurs in a power distribution line by inputting waveform data of an electric amount measured in the power distribution line or one or more feature values the waveform data to a trained model received from a master station. The slave station transmits the measured waveform data to the master station when the inference device infers that the fault symptom occurs. When the fault symptom actually occurs, the master station's learning device adds the waveform data received from the slave station or ore or more feature values of the waveform data to training data for updating the trained model, and performs additional learning to update the trained model.

12 Claims, 15 Drawing Sheets

(51) Int. Cl.
    *G06N 5/046*     (2023.01)
    *H02H 1/00*     (2006.01)

(56) References Cited

U.S. PATENT DOCUMENTS

| | | | |
|---|---|---|---|
| 6,597,180 B1 * | 7/2003 | Takaoka | G01R 31/088 |
| | | | 324/522 |
| 2016/0011252 A1 * | 1/2016 | Kang | H02H 7/26 |
| | | | 702/59 |
| 2020/0409323 A1 * | 12/2020 | Spalt | G06F 17/18 |

FOREIGN PATENT DOCUMENTS

| | | | | |
|---|---|---|---|---|
| JP | 2000050488 A | | 2/2000 | |
| JP | 2005304114 | * | 10/2005 | ............ G01R 25/00 |
| JP | 4142608 B2 | | 9/2008 | |
| JP | 5049675 B2 | | 10/2012 | |
| JP | 2013-207990 A | | 10/2013 | |
| JP | 2019-208317 A | | 12/2019 | |
| JP | 2020-092569 A | | 6/2020 | |

* cited by examiner

FIG.5A
| WAVEFORM DATA ID | CAUSE OF FAULT SYMPTOM | SLAVE STATION ID | DATE & TIME OF SENSING |
|---|---|---|---|
| 001 | CONTACT OF TREE | K001 | XXXX.XX.XX |
| 002 | CONTACT OF BIRD/ANIMAL | K008 | YYYY.YY.YY |
| 003 | NO INDICATION OF FAULT SYMPTOM | K101 | ZZZZ.ZZ.ZZ |
| ⋮ | ⋮ | ⋮ | ⋮ |
FIG.5B
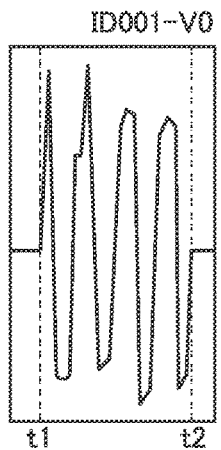
FIG.5C
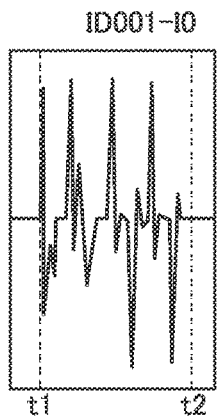

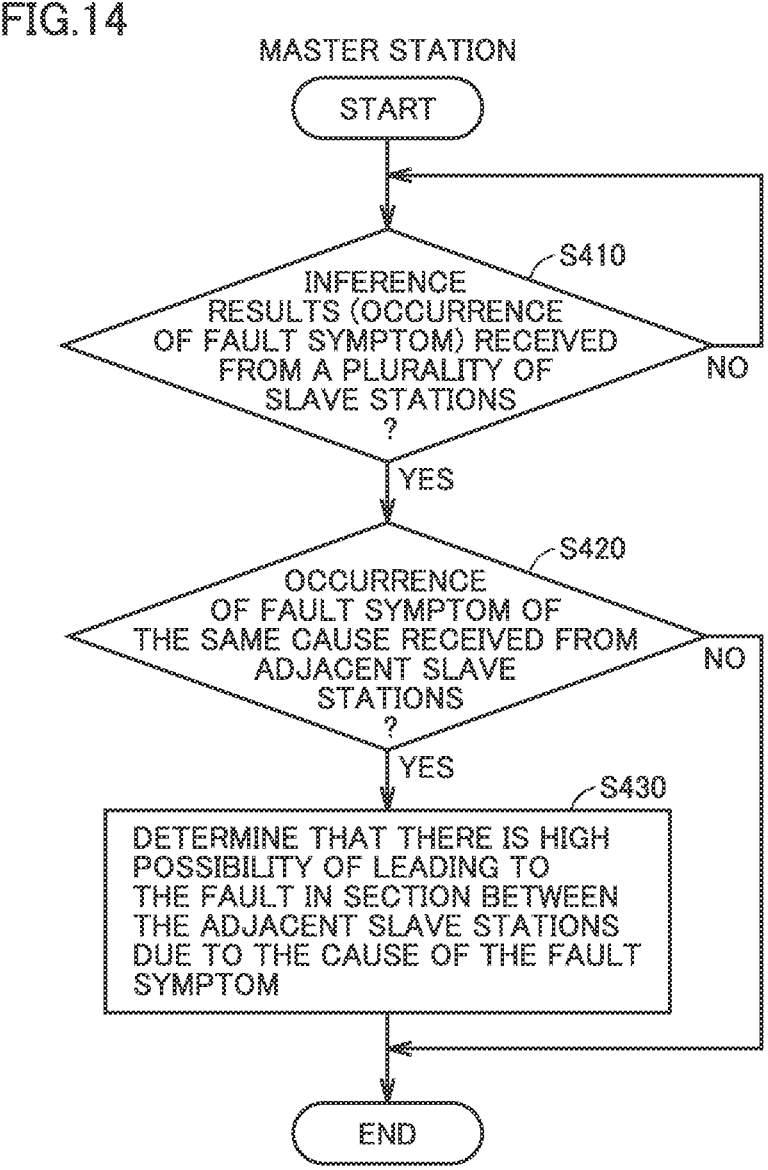

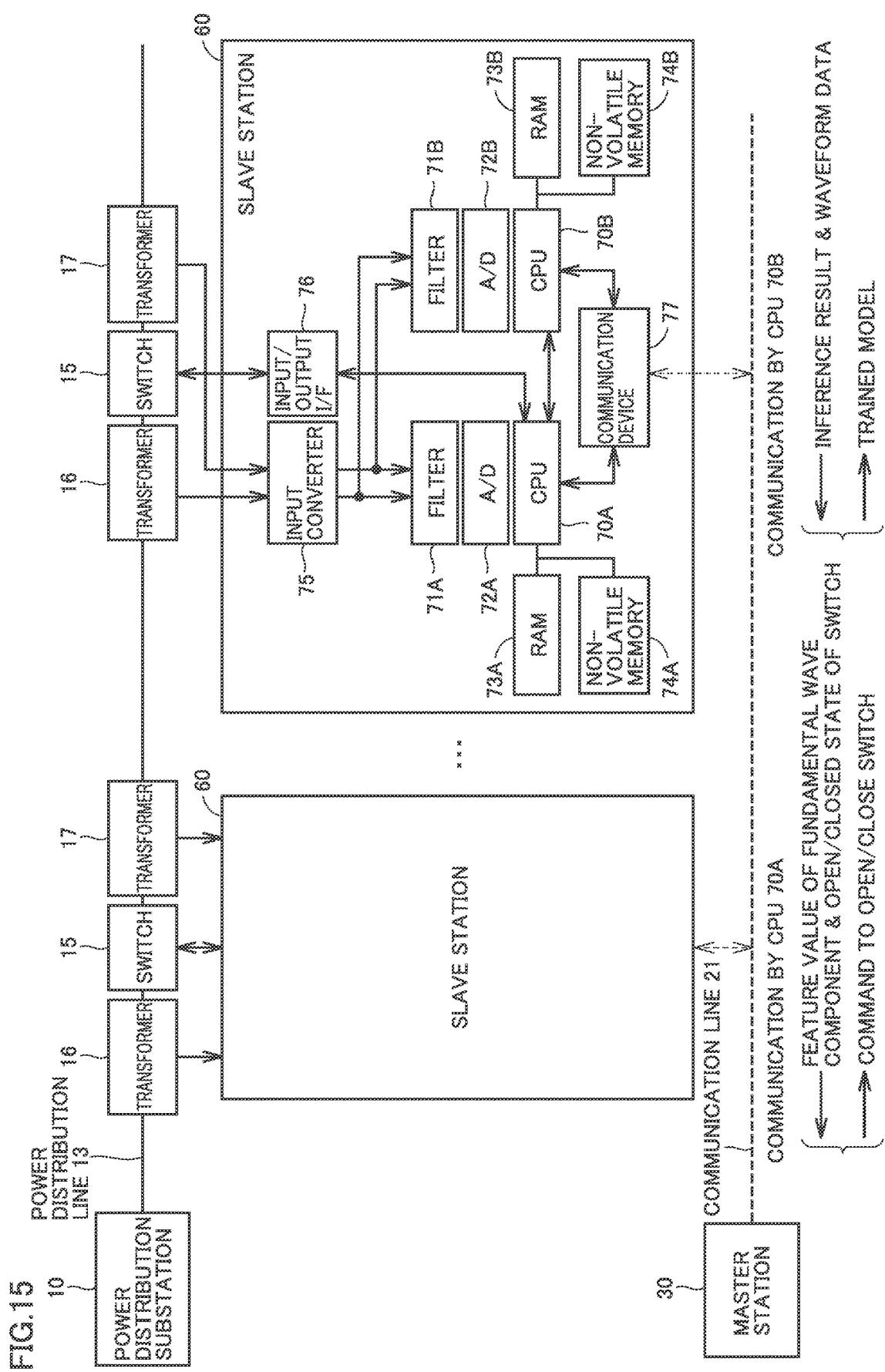

SYSTEM AND METHOD FOR SENSING FAULT SYMPTOM BEFORE OCCURRENCE OF FAULT UTILIZING NEURAL NETWORK MODEL

BACKGROUND OF THE INVENTION

Field of the Invention

The present disclosure relates to a fault symptom sensing system, a fault symptom sensing method, and master and slave stations of the fault symptom sensing system, which allow sensing of a slight and incipient abnormality, i.e. a fault symptom, in a power distribution line before a fault actually occurs.

Description of the Background Art

Among faults of power distribution lines, for example, a ground fault is caused by thunderbolt, a degraded cable, a tree coming in contact with the line, a bird/animal coming into contact with the line, and the like. For these causes excluding thunderbolt, a ground fault does not occur suddenly; rather, a precursory phenomenon often occurs in which a slight leakage current flows before the fault occurs. Therefore, if a fault symptom in a power distribution line can be sensed, a maintenance work can be performed before the fault of the power distribution line actually occurs.

Japanese Patent No. 4142608 discloses an example of a method for sensing a fault symptom caused by a tree coming into contact with a power distribution line. Specifically, according to this document, the magnitude of a zero-phase sequence voltage, the magnitude of a zero-phase sequence current, and the phase difference between the zero-phase sequence voltage and the zero-phase sequence current are measured for each set period in a plurality of slave stations located at appropriate locations along a power distribution line. A central monitoring system receives these detection values from each slave station via network communications, and determines that the power distribution line is in contact with a tree when these detection values have a monotonically increasing or decreasing temporal change over a period of time ranging from several minutes to several tens of minutes.

Although it does not relate to a fault symptom, Japanese Patent Laid-Open No. 11-142466 discloses a method for estimating a cause of a fault based on a waveform of the fault when a ground fault actually occurs. Specifically, according to this document, a zero-phase sequence voltage waveform and a zero-phase sequence current waveform when a ground fault occurs are analyzed from multiple points of view, and a plurality of analysis values obtained are input to a trained neural network model. As a result, a fault phase is identified, and a result of an estimation of a cause of the fault is output.

SUMMARY OF THE INVENTION

When constructing a fault symptom sensing system using artificial intelligence, it is necessary to collect a large amount of training data for machine learning. Collecting the training data, however, have the following problem to be solved.

Specifically, while such a system of estimating a cause of a fault, as disclosed in Japanese Patent Application Laid-Open No. 11-142466, can collect waveform data when a fault occurs, it is difficult to determine when to collect waveform data for a predictive phenomenon before a fault occurs. This is because a fault symptom included in a zero-phase sequence voltage and a zero-phase sequence current is a weak indication and thus difficult to distinguish from a change in waveform caused when a power distribution system is normally operated, and it is thus difficult to utilize a change in signal level as a trigger. As another measure to collect waveform data of a fault symptom, a zero-phase sequence voltage and a zero-phase sequence current may constantly be measured at a plurality of slave stations provided for a power distribution line and the measured waveform data may constantly be transmitted to the master station and monitored. However, doing so is not practical as it invites increased traffic.

The present disclosure has been made in view of the above problem to be solved, and an object thereof in one aspect is to provide a fault symptom sensing system for a power distribution line, that can sense a fault symptom with high accuracy by efficiently collecting training data.

According to an embodiment, a fault symptom sensing system comprises a plurality of slave stations provided for a power distribution line, and a master station connected to the plurality of slave stations via a communication line. The plurality of slave stations each include an inference device to infer whether a fault symptom occurs or not by inputting waveform data of an electric amount measured in the power distribution line or one or more feature values of the waveform data to a trained model generated from training data including waveform data of the electric amount indicating the fault symptom. The plurality of slave stations each transmit the waveform data to the master station when the inference device infers that the fault symptom occurs. The master station includes a learning device to generate the trained model. When the inference device of at least one slave station infers that the fault symptom occurs and the power distribution line actually has a defect, the master station adds the waveform data received from the at least one slave station or one or more feature values of the waveform data to training data for updating the trained model. The learning device updates the trained model using the training data for updating, and distributes the updated trained model to the plurality of slave stations.

The foregoing and other objects, features, aspects and advantages of the present disclosure will become more apparent from the following detailed description of the present disclosure when taken in conjunction with the accompanying drawings.

BRIEF DESCRIPTION OF DRAWINGS

FIGS. 5A to 5C are diagrams for illustrating an example of training data.

FIG. 14 is a flow chart indicating an example of a procedure of estimating a section having a high possibility of having a portion leading to a fault.

FIG. 15 is a diagram showing an example of a hardware configuration of the slave station.

DESCRIPTION OF THE PREFERRED EMBODIMENTS

Figure 1:
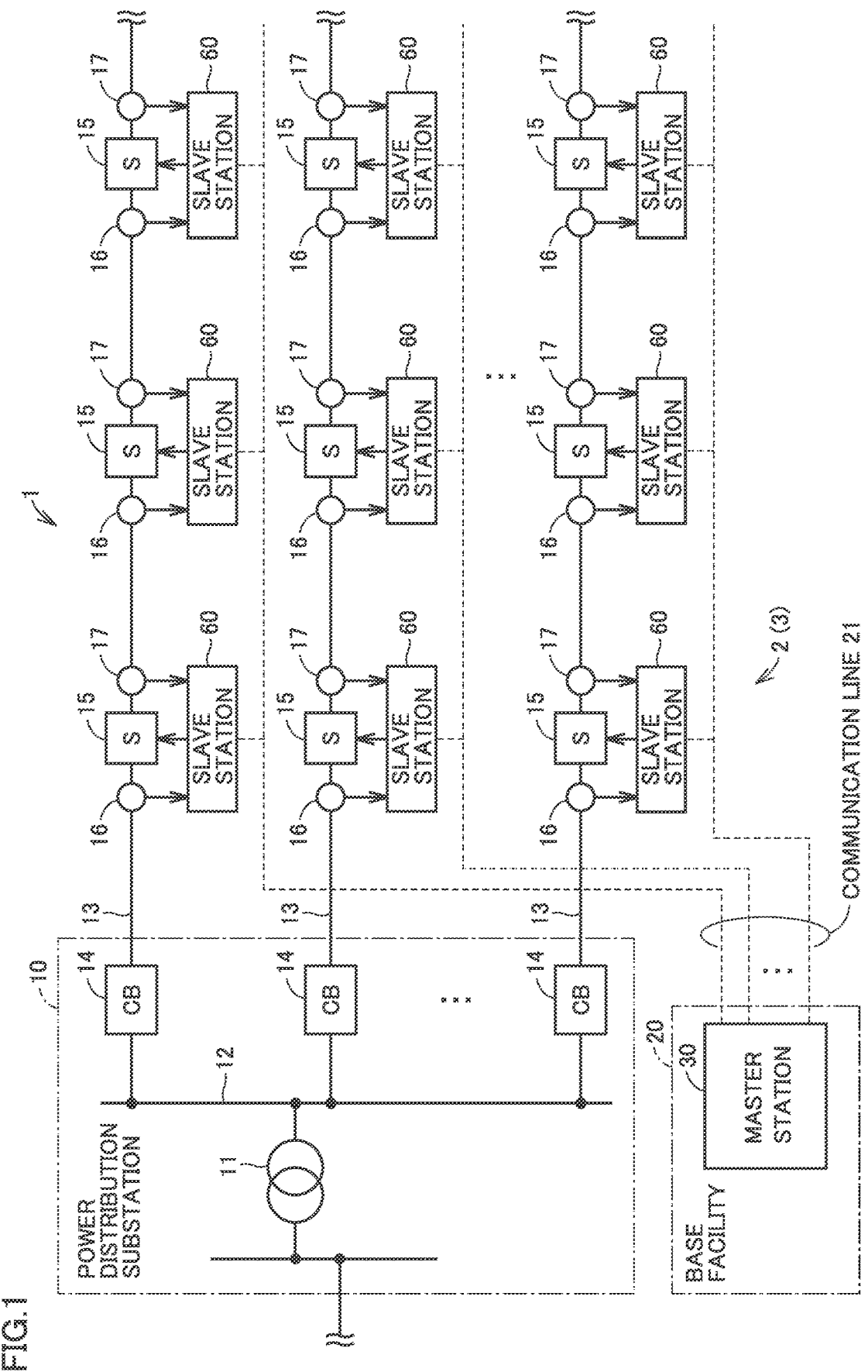
FIG. 1 is a block diagram conceptually showing a configuration of a power distribution system to which a fault symptom sensing system according to a first embodiment is applied.

Hereinafter, each embodiment will specifically be described with reference to the drawings. Identical or equivalent components are identically denoted in the drawings and will not be described redundantly.

First Embodiment

[Conceptual Diagram of Power Distribution System and Fault Symptom Sensing System]

FIG. 1 is a block diagram conceptually showing a configuration of a power distribution system to which a fault symptom sensing system according to a first embodiment is applied. A power distribution system 1 shown in FIG. 1 represents an actual power distribution system in a simplified manner for describing a fault symptom sensing system 2.

Referring to FIG. 1 power distribution system 1 includes a bus bar 12 provided in a power distribution substation 10, a plurality of power distribution lines 13 extending from the bus bar 12 via a circuit breaker (CB) 14, and a plurality of section switches 15 disposed along power distribution line 13 and spaced from one another. Transformers 16 and 17 are provided at opposite ends of each section switch 15. Transformers 16 and 17 each include a voltage transformer (VT) and a current transformer (CT). Bus bar 12 is connected to a power transmission line via a transformer 11.

Fault symptom sensing system 2 senses a fault symptom in power distribution line 13 based on waveform data of an electric amount measured in power distribution line 13 (e.g., waveform data of a zero-phase sequence voltage or a zero-phase sequence current). As shown in FIG. 1 fault symptom sensing system 2 includes slave stations 60 disposed along power distribution line 13 at a plurality of locations spaced from one another, and a master station 30 connected to each slave station 60 via a communication line 21. Master station 30 is provided in a base facility 20 for monitoring and controlling power distribution system 1. Communication line 21 may be wired or wireless, and it is for example an optical fiber communication line.

For the present embodiment, slave station 60 and master station 30 of fault symptom sensing system 2 also serve as slave station 60 and master station 30 of a power distribution automation system 3. A basic function of power distribution automation system 3 is to remotely monitor and control each section switch 15 of power distribution system 1. Accordingly, fault symptom sensing system 2 shown in FIG. 1 has each slave station 60 provided to individually correspond to each section switch 15. Fault symptom sensing system 2 may be configured as a system separate from power distribution automation system 3.

[Exemplary Configuration of Master Station]

Figure 2:
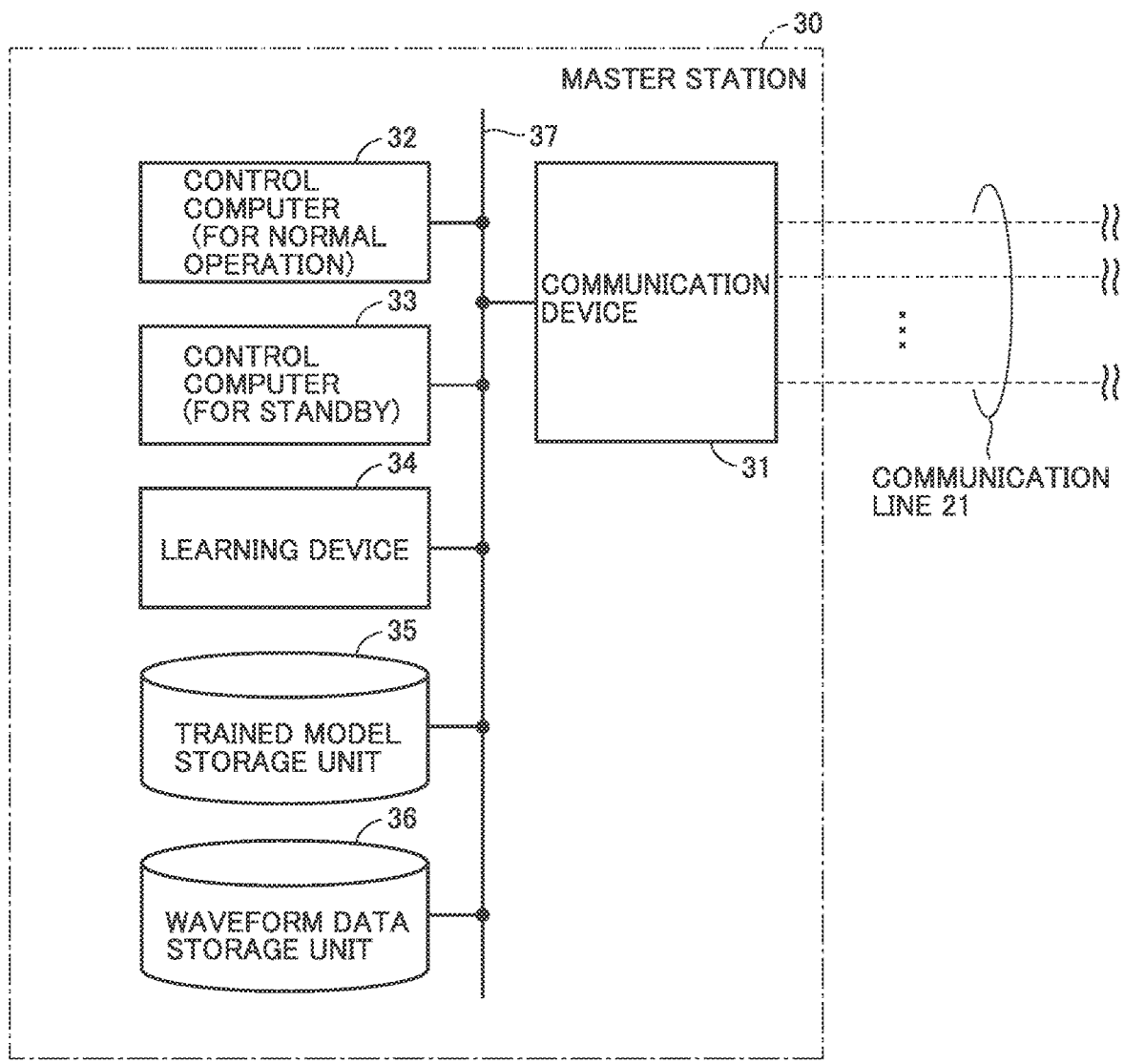
FIG. 2 is a block diagram showing an example of a configuration of a master station shown in FIG. 1.

FIG. 2 is a block diagram showing an example of a configuration of the master station shown in FIG. 1. Referring to FIG. 2, master station 30 includes a communication device 31, control computers 32 and 33, a learning device 34, a trained model storage unit 35, and a waveform data storage unit 36. These components are interconnected via a network 37.

Communication device 31 is connected to a large number of communication lines 21 shown in FIG. 1. Communication device 31 communicates with each slave station 60 via communication line 21 in response to an instruction received from control computer 32 or 33.

Control computers 32 and 33 are provided to implement a function as power distribution automation system 3. Control computer 32 is provided for normal operation, and control computer 33 is provided as a standby used when control computer 32 fails. Control computers 32 and 33 obtain from slave station 60 detection values such as an effective value, a frequency, a power and the like of a fundamental wave component of a voltage and a current detected by transformers 16 and 17. Further, control computers 32 and 33 control opening-closing of section switch 15 via slave station 60.

Learning device 34 generates a trained model for sensing a fault symptom in power distribution line 13. Trained model storage unit 35 stores the generated trained model. Waveform data storage unit 36 stores waveform data of an electric amount generated from instantaneous value data of the voltage of power distribution line 13 and/or instantaneous value data of the current of the waveform data (e.g., waveform data of a zero-phase sequence voltage or a zero-phase sequence current), and information associated with the waveform data. The waveform data of the electric amount is used in learning device 34 for machine learning.

Figure 3:
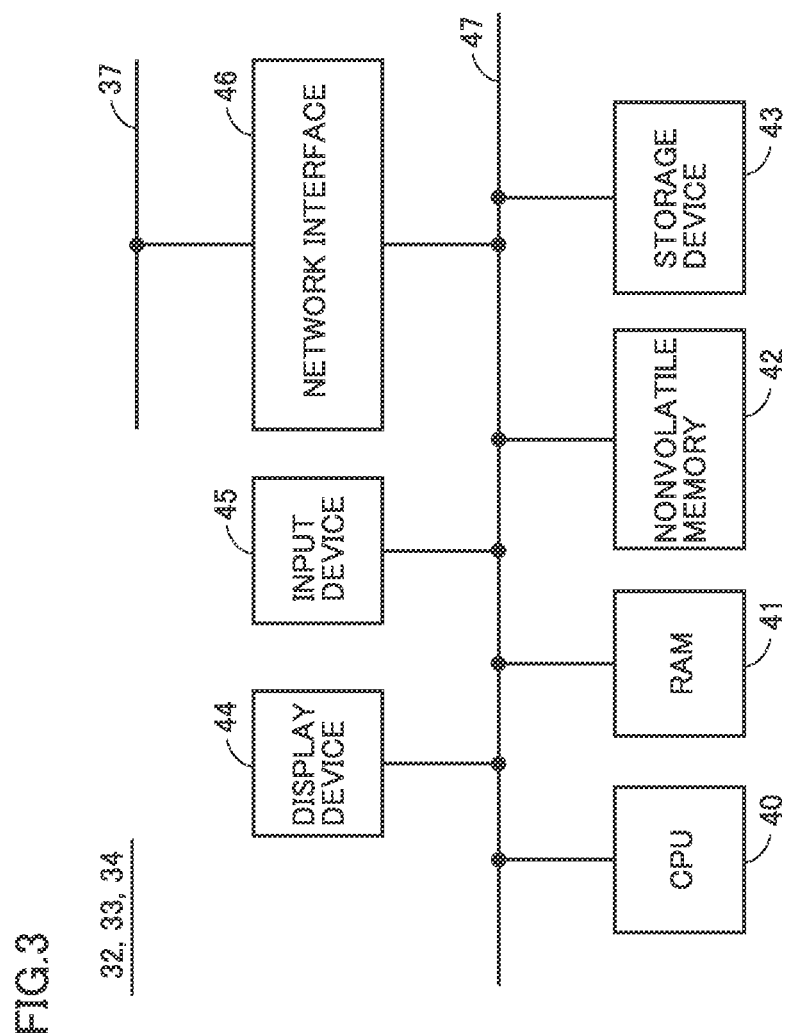
FIG. 3 is a block diagram showing an example of a hardware configuration of a control computer and a learning device shown in FIG. 2.

FIG. 3 is a block diagram showing an example of a hardware configuration of the control computers and learning device shown in FIG. 2. Referring to FIG. 3, control computers 32 and 33 and learning device 34 each include at least one central processing unit (CPU) 40, at least one random access memory (RAM) 41, at least one nonvolatile memory 42, at least one storage device 43, a display device 44, an input device 45, and a network interface 46. These elements are interconnected via a bus 47.

CPU 40 executes a program stored in nonvolatile memory 42 or storage device 43. The program may be stored in a non-transitory storage medium and thus provided, or may be provided via a network. CPU 40 may be a general-purpose processor or a processor dedicated for a specific purpose. CPU 40 may be replaced with an application-specific integrated circuit (ASIC) or a field programmable gate array (FPGA), or may be any combination thereof.

RAM 41 is used as a working memory for CPU 40, and nonvolatile memory 42 and storage device 43 store programs and data. RAM 41 is for example a dynamic random access memory (DRAM), a static random access memory (SRAM), or the like. Nonvolatile memory 42 is for example a mask read only memory (mask ROM), an electrically erasable programmable read-only memory (EEPROM), a NOR flash memory, a NAND Hash memory, or the like.

Storage device 43 is for example a hard disk, a solid state drive (SSD) or the like. The FIG. 2 trained model storage unit 35 and waveform data storage unit 36 may be configured as storage device 43 included in learning device 34.

Display device 44 displays information to an operator, and input device 45 receives an input from the operator. Display device 44 includes, for example, a display such as a liquid crystal display or an organic electro luminescence (EL) display. Input device 45 includes, for example, an operation button, a switch, a keyboard, and a mouse. Display device 44 and input dev ice 45 may be integrated together and thus configured as a touch screen. Display device 44 and input device 45 may be shared by control computers 32 and 33 and learning device 34.

Network interface 46 is an interface circuit to connect to network 37 shown in FIG. 2.

An exemplary configuration of slave station 60 will be described with reference to FIG. 15. Slave station 60 may have a hardware configuration substantially identical to that of a switch slave station of power distribution automation system 3, or may be a configuration further expanded as shown in FIG. 15.

[Operation of Fault Symptom Sensing System]

Hereinafter, an operation of fault symptom sensing system 2 will be described with reference to FIGS. 4 to 10. As will be described below, one feature of fault symptom sensing system 2 of the present embodiment is that an inference device using a trained model can be used not only to determine waveform data indicating a fault symptom but also to efficiently collect training data for updating the trained model.

(Overview of Operation of Fault Symptom Sensing System)

Figure 4:
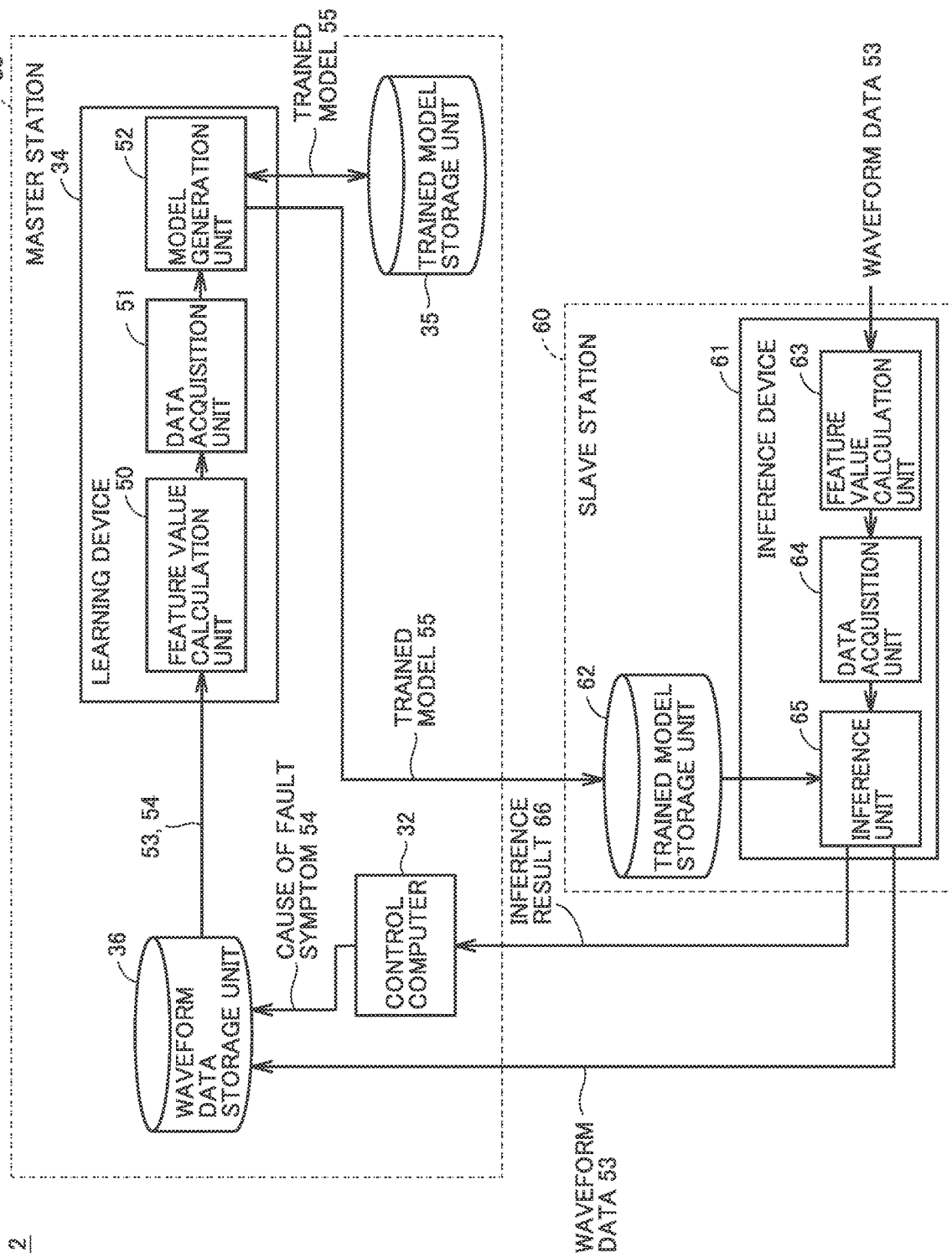
FIG. 4 is a functional block diagram for illustrating an operation of the fault symptom sensing system.

FIG. 4 is a functional block diagram for illustrating an overview of an operation of the fault symptom sensing system. Fault symptom sensing system 2 includes learning device 34, trained model storage unit 35 and waveform data storage unit 36 provided in master station 30, and an inference device 61 and a trained model storage unit 62 provided in slave station 60.

Learning device 34 of master station 30 generates a trained model 55 based on training data including a combination of waveform data 53 of an electric amount measured in power distribution line 13 that includes a fault symptom and/or one or more feature values of waveform data 53 (i.e., input data) and a cause 54 of the fault symptom corresponding thereto (i.e., a desired output value, also called as a supervisory signal, a ground truth, a label, a target, teaching data, etc.).

Herein, as waveform data 53 of an electric amount, for example, waveform data of at least one of a zero-phase sequence voltage and a zero-phase sequence current is used, flic waveform data has a feature value, which is extracted for example by subjecting waveform data 53 to Fourier transform, wavelet transform, pattern recognition or a similar processing. A feature value is selected to improve accuracy of learning by learning device 34 and accuracy of inference by inference device 61, and is not limited to the above example. Cause 54 of a fault symptom includes, for example, at least one of insulation failure of cable; defects of an insulator; defects of a transformer; contact of a metal, a tree and/or a bird/animal with a power distribution line; and the like.

It is desirable that the training data include a combination of waveform data 53 and/or one or more feature values thereof and a result of confirmation that power distribution line 13 is in a normal state (that is, there is no fault symptom). This is because a zero-phase sequence current may be generated in power distribution line 13 even in a normal state due to an operation of the power distribution system such as opening and closing a switch or variation load. Causing the training data to include waveform data obtained in the normal state can increase accuracy of sensing a fault symptom. Further, for a multiclass classification problem relevant to the present disclosure, it is desirable to also have a result of a recognition that no fault has occurred. In particular, when a softmax function is used in an output layer to output a probability of occurrence of each cause of a fault, a classification of there being no indication of a fault symptom is required.

Master station 30 stores the generated trained model 55 to trained model storage unit 35 and also distributes it to each slave station 60.

Although it is desirable that trained model 55 can identify a cause of a fault symptom, it may simply estimate whether there is a fault symptom in power distribution line 13 or not. In particular, at an initial stage in which little progress is made in learning, trained model 55 may only be able to output whether there is a fault symptom in power distribution line 13 or not. In that case, learning device 34 generates trained model 55 basal on training data including a combination of waveform data 53 of an electric amount measured in power distribution line 13 and/or one or more feature values of waveform data 53 and whether there is a fault symptom corresponding thereto (i.e., a desired output value).

Each slave station 60 stores the distributed trained model 55 to trained model storage unit 62. Further, inference device 61 of each slave station 60 inputs waveform data 53 of an electric amount measured in power distribution line 13 or one or more feature values of waveform data 53 to the distributed trained model 55, and thereby infers whether there is a fault symptom in power distribution line 13 and a cause of the fault symptom. When inference device 61 of at least one slave station 60 infers that there is a fault symptom (that is, when there is a high probability that a cause of a fault symptom is caused), the at least one slave station 60 transmits the result 66 of the inference representing the estimated cause of the fault symptom to control computer 32 of master station 30. Further, in that case, the at least one slave station 60 transmits to master station 30 waveform data 53 estimated to present the fault symptom.

When control computer 32 of master station 30 receives inference result 66 from at least one slave station 60, control computer 32 causes display device 44 to display the identification indicator of that slave station 60 and the received inference result 66 to notify the operator thereof. Further, master station 30 stores the received waveform data 53 and information associated therewith to waveform data storage unit 36. The information associated with waveform data 53 includes, for example, the identification number (ID) of waveform data 53, the identification number (ID) of the slave station that obtains that waveform data 53, the date and time when that waveform data 53 is detected, etc.

When a maintenance work is performed by maintenance personnel and it is proved therefrom that the estimated cause 54 of a fault symptom is actually caused, the operator inputs that fact to control computer 32. Based on this input, control computer 32 associates the proved cause 54 of the fault symptom with waveform data 53 stored in waveform data storage unit 36. As a result, a combination of waveform data 53 and the cause 54 of the fault symptom as above is added to the training data used for updating the trained model.

When the training data is accumulated, learning device 34 performs additional learning to update trained model 55. Master station 30 stores the updated trained model 55 to trained model storage unit 35 and also distributes it to each slave station 60.

(Specific Example of Training Data)

FIGS. 5A to 5C are diagrams for illustrating an example of training data and information associated therewith. FIG. 5A is a diagram for illustrating an example of training data and the associated information in the form of a table. FIGS. 513 and 5C are diagrams showing an example of waveform data corresponding to ID 001 indicated in FIG. 5A.

Referring to FIGS. 5A to 5C, training data and associated information stored in waveform data storage unit 36 include a waveform data ID, waveform data corresponding to the waveform data ID, a cause of a fault symptom, a slave station ID, and a date and time of sensing. For example, the waveform data of waveform data ID 001 includes zero-phase sequence voltage data of ID 001-V0 indicated in FIG. 5B and zero-phase sequence current data of ID 001-10 indicated in FIG. 5C. These waveform data are detected simultaneously in a slave station having a slave station ID=K001 at a detection date and time of XXXX/XX/XX (that is, between a time t1 and a time t2). A cause of a fault symptom corresponding thereto, that is, "contact of a tree", is clarified through a maintenance work performed by maintenance personnel, and is input by an operator after the time at which the waveform data is detected.

(Detailed Exemplary Functional Configuration of Learning Device and Inference Device)

Hereinafter, a more detailed exemplary functional configuration of learning device 34 and inference device 61 will be described. Referring to FIG. 4, more specifically, learning device 34 includes a feature value calculation unit 50, a data acquisition unit 51, and a model generation unit 52.

Feature value calculation unit 50 calculates one or more feature values of waveform data 53. For example, feature value calculation unit 50 receives waveform data 53 of instantaneous values of a zero-phase sequence voltage and a zero-phase sequence current and subjects the received waveform data 53 to Fourier transform, wavelet transform, pattern recognition or a like process to extract a feature value.

Data acquisition unit 51 acquires, as training data, one or more feature values of waveform data 53 and the cause 54 of a fault symptom as a desired output value corresponding to waveform data 53.

Model generation unit 52 receives from data acquisition unit 51 training data created from one or more feature values of waveform data 53 and a cause 54 of the fault symptom (that is, a desired output) and uses the received training data to learn the cause of the fault symptom. That is, from a cause 54 of the fault symptom and one or more feature values of waveform data 53 measured in power distribution line 13 when the cause 54 of the fault symptom is caused, model generation unit 52 generates trained model 55 that outputs as inference result 66 a probability of occurrence of the cause of the fault symptom when one or more feature values of newly measured waveform data 53 are received. Herein, the training data is data of one or more feature values of waveform data 53 and a cause 54 of a fault symptom (that is, a desired output) associated with each other.

Model generation unit 52 uses a learning algorithm, which can be a known supervised learning algorithm. As an example, a ease with a neural network applied will be described.

Model generation unit 52 learns a cause of a fault symptom through so-called supervised learning in accordance with a neural network model, for example. Herein, supervised learning refers to a method in which when a set of data of an input and a result (i.e., a label) is provided to a learning device, a feature in the training data is learned, and a result is inferred from the input.

The neural network includes an input layer composed of a plurality of neurons, an intermediate (or hidden) layer composed of a plurality of neurons, and an output layer composed of a plurality of neurons. The intermediate layer may be one layer or two or more layers.

Figure 6:
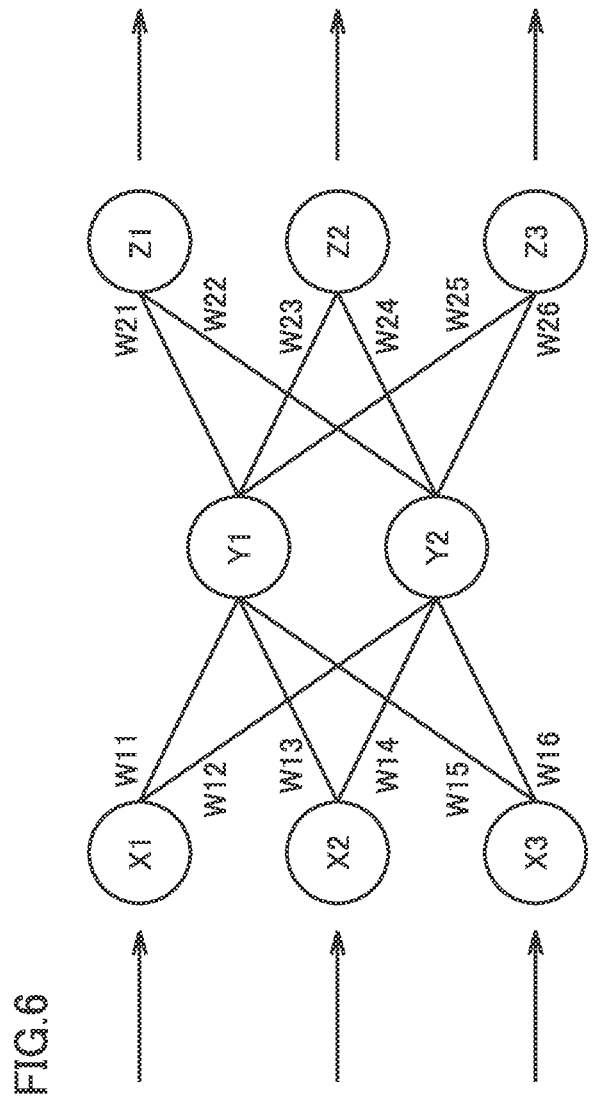
FIG. 6 is a diagram showing an example of a three-layer neural network.

FIG. 6 is a diagram showing an example of a three-layer neural network. FIG. 6 shows a neural network including input layers $X1$ to $X3$, intermediate layers $Y1$ and $Y2$, and output layers $Z1$ to $Z3$. When input layers $X1$ to $X3$ receive a plurality of inputs, their values are multiplied by a weight $W1$ ($W11$ to $W16$), and resultant multiplications are input to intermediate layers $Y1$ and $Y2$. In each of intermediate layers $Y1$ and $Y2$, resultant multiplications are accumulated, and an activation function is applied to the resultant accumulation. Further, intermediate layers $Y1$ and $Y2$ have their calculation results multiplied by a weight $W2$ ($W21$ to $W26$), and resultant multiplications are input to output layers $Z1$ to $Z3$. In each of output layers $Z1$ to $Z3$, resultant multiplications are accumulated, and an activation function is applied to the resultant accumulation. Therefore, output layers $Z1$ to $Z3$ provide calculation results varying with the values of weights $W1$ and $W2$.

For a multiclass classification problem to which the present disclosure is relevant, a softmax function is generally used as an activation function in output layers $Z1$ to $Z3$. For example, it is assumed that resultant accumulations of the inputs in output layers $Z1$ to $Z3$ are $z1$, $z2$, and $z3$, respectively. In that case, the softmax function in an output layer $Zi(i=1$ to $3)$ has a value fi expressed as follows:

$$fi = \exp(zi) / [(\exp(z1) + \exp(z2) + \exp(z3))].$$

Therefore, $f1+f2+f3=1$, and the softmax function's output can be interpreted as a probability.

No softmax function may be used in output layers $Z1$ to $Z3$, and a resultant accumulation of the inputs in each of output layers $Z1$ to $Z3$ may be output as it is (that is, this means that the activation function in output layers $Z1$ to $Z3$ is an identity function). In that case, only a class corresponding to a neuron having the largest output will be a recognized result. Calculating an exponential function included in the softmax function involves a problem of overflow, and accordingly, calculating the softmax function may be omitted.

In model generation unit 52 of FIG. 4, the neural network learns a probability of occurrence for each cause of a fault symptom through so-called supervised learning in accordance with training data created based on a combination of one or more feature values of waveform data 53 and a cause 54 of the fault symptom (that is, a desired output) as acquired by data acquisition unit 51. That is, the neural network learns by adjusting weights $W1$ and $W2$ such that a result output from output layers $Z1$ to $Z3$ by inputting one or more feature values of waveform data 53 to input layers $X1$ to $X3$ approaches the indication of the cause 54 of the fault symptom (that is, the desired output).

For example, in the output layer of FIG. 6, it is assumed that output layer $Z1$ indicates a tree in contact with a power distribution line, output layer $Z2$ indicates a bird/animal in contact with a power distribution line, and output layer $Z3$ is no indication of a fault symptom. Herein, inputting to input layers $X1$ to $X3$ feature values based on waveform data obtained when a tree is in contact with a power distribution line provides desired output values such that output layer Z1 provides an output=1 and output layers Z2 and Z3 each provide an output=0.

Note that, in the above, feature value calculation unit 50 may be dispensed with. In that case, the training data is data of waveform data 53 (e.g., waveform data of a zero-phase sequence voltage and a zero-phase sequence current) and a cause 54 of a fault symptom (or a desired output) associated with each other.

Further, the learning algorithm used in model generation unit 52 can be deep learning to leant extraction of a feature value per se. Machine learning may be performed according to other known methods, such as genetic programming, functional logic programming, and support vector machine.

Model generation unit 52 generates and outputs trained model 55 by performing such learning as described above. Trained model storage units 35 and 62 store the trained model output from model generation unit 52.

Referring again to FIG. 4, inference device 61 includes a feature value calculation unit 63, a data acquisition unit 64, and an inference unit 65.

Feature value calculation unit 63 extracts one or more feature values that are the same as those of feature value calculation unit 50 of learning device 34 from waveform data 53 of an electric amount (e.g., waveform data of a zero-phase sequence voltage and a zero-phase sequence current) measured in power distribution line 13.

Data acquisition unit 64 acquires one or more feature values extracted by feature value calculation unit 63.

Inference unit 65 infers one or more causes of a fault symptom obtained through trained model 55. That is, inference unit 65 inputs one or more feature values of waveform data 53 that are acquired in data acquisition unit 64 to trained model 55 to output a probability of occurrence for each cause of a fault symptom inferred from waveform data 53. How many causes are inferred for a fault symptom is not limited to one cause. When a probability of occurrence of a cause of a fault symptom exceeds a threshold, slave station 60 transmits inference result 66 output from inference unit 65 to control computer 32 of master station 30. Furthermore, in that case, slave station 60 transmits waveform data 53 input to feature value calculation unit 63 and information associated therewith to waveform data storage unit 36 of master station 30. Setting of the above threshold value can be changed by master station 30.

When learning device 34 is not provided with feature value calculation unit 50, inference device 61 is not provided with feature value calculation unit 63, either. In that case, inference device 61 inputs to trained model 55 waveform data 53 (e.g., waveform data of a zero-phase sequence voltage and a zero-phase sequence current) acquired in data acquisition unit 64.

(Example of Operation of Fault Symptom Sensing System)

Figure 7:
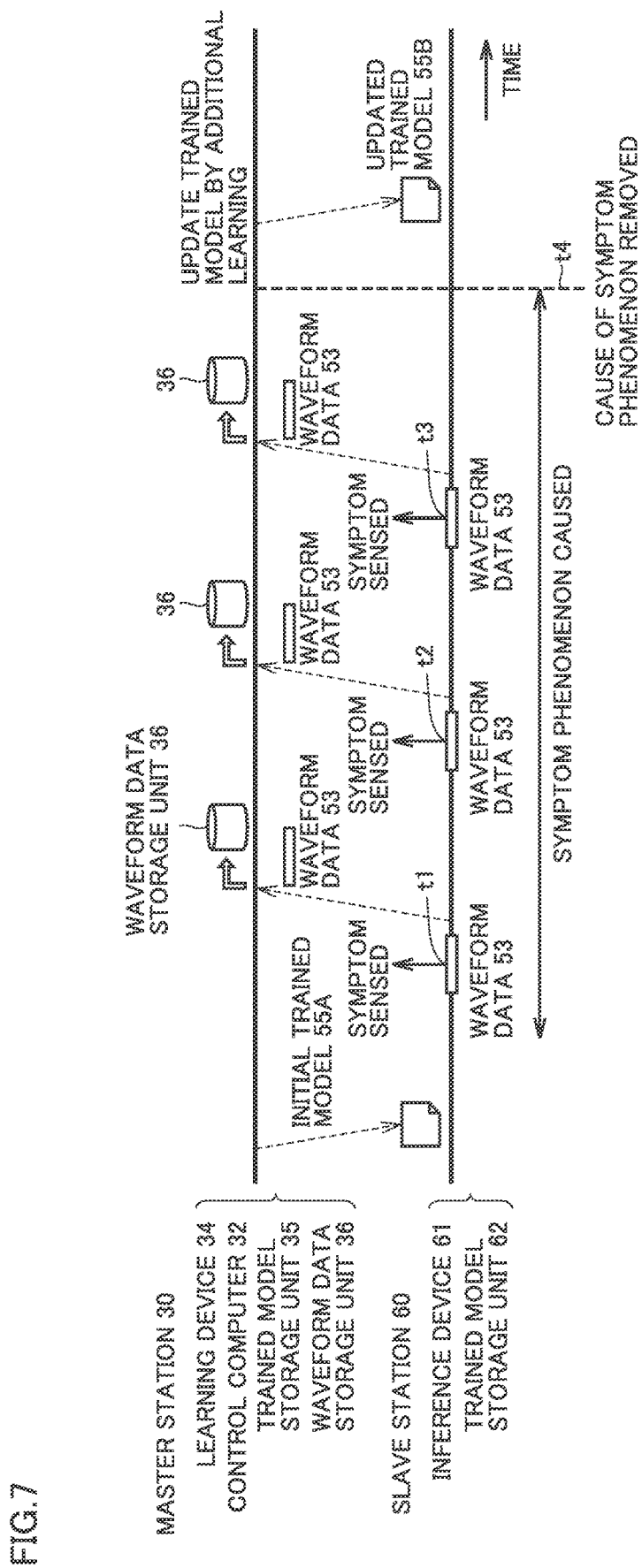
FIG. 7 is timing plots representing an example of a time-series operation of a master station and a slave station.

FIG. 7 is timing plots representing an example of a time-series operation of the master and slave stations. Referring to FIG. 7, initially, master station 30 distributes an initial trained model 55A to slave stations 60.

Training data used when initial mined model 55A is generated need not be based on waveform data 53 of an electric amount measured in power distribution line 13. For example, a waveform of a zero-phase sequence voltage and a zero-phase sequence current in power distribution line 13 when a cause 54 of a fault symptom is caused may be obtained through a simulation, and one or more feature values of the simulated waveform may be used as training data. Alternatively, waveform data of a zero-phase sequence voltage and a zero-phase sequence current detected in an experiment using an actual power distribution line 13, and/or one or more feature values based on that waveform data, may be used as training data.

Inference device 61 of slave station 60 calculates periodically for each determination period a probability of occurrence of a cause 54 of a fault symptom based on waveform data 53 of an electric amount (e.g., waveform data of a zero-phase sequence voltage and a zero-phase sequence current) measured in power distribution line 13. Since an abnormal waveform based oil a fault symptom docs not change rapidly, the determination period is set as desired in a range of 100 milliseconds to 1 hour, for example.

Inference device 61 outputs inference result 66 to control computer 32 of master station 30 when a fault symptom is sensed, that is, when a probability of occurrence of a cause 54 of the fault symptom exceeds a threshold value. In that case, furthermore, slave station 60 transmits waveform data 53 corresponding thereto and information associated therewith to waveform data storage unit 36 of master station 30. Waveform data storage unit 36 receives and stores waveform data 53 and the associated information.

In the case of FIG. 7, a fault symptom is sensed at times t1, t2, and t3 for the sake of illustration. Whenever a fault symptom is sensed, inference device 61 of slave station 60 notifies master station 30 of inference result 66 and transmits waveform data 53 to master station 30. Basically, the above notification and data transmission will be repeated until the cause 54 of the fault symptom is removed by a maintenance work or naturally disappears.

When the same cause 54 of the fault symptom is detected and there is no substantial difference in one or more feature values of waveform data 53, it is unnecessary to notify master station 30 of the fault symptom and transmit waveform data 53 to master station 30 whenever the fault symptom is sensed. In that case, whether the notification and the data transmission are performed whenever a fault symptom is sensed may be changeable by setting.

In the case of FIG. 7, the cause of the fault symptom is removed by maintenance personnel through a maintenance work at time t4 for the sake of illustration. In response to an input by an operator, control computer 32 associates the actual cause of the fault symptom with waveform data 53 stored in waveform data storage unit 36. Thus, a set of one or more feature values of waveform data 53 and the cause 54 of the fault symptom can be included in additional training data.

Thereafter, learning device 34 of master station 30 updates initial trained model 55A by performing additional learning based on a large number of waveform data 53 stored in waveform data storage unit 36 and causes 54 of fault symptoms each associated with one of waveform data 53. Learning device 34 distributes an updated trained model 55B to slave stations 60.

Figure 8:
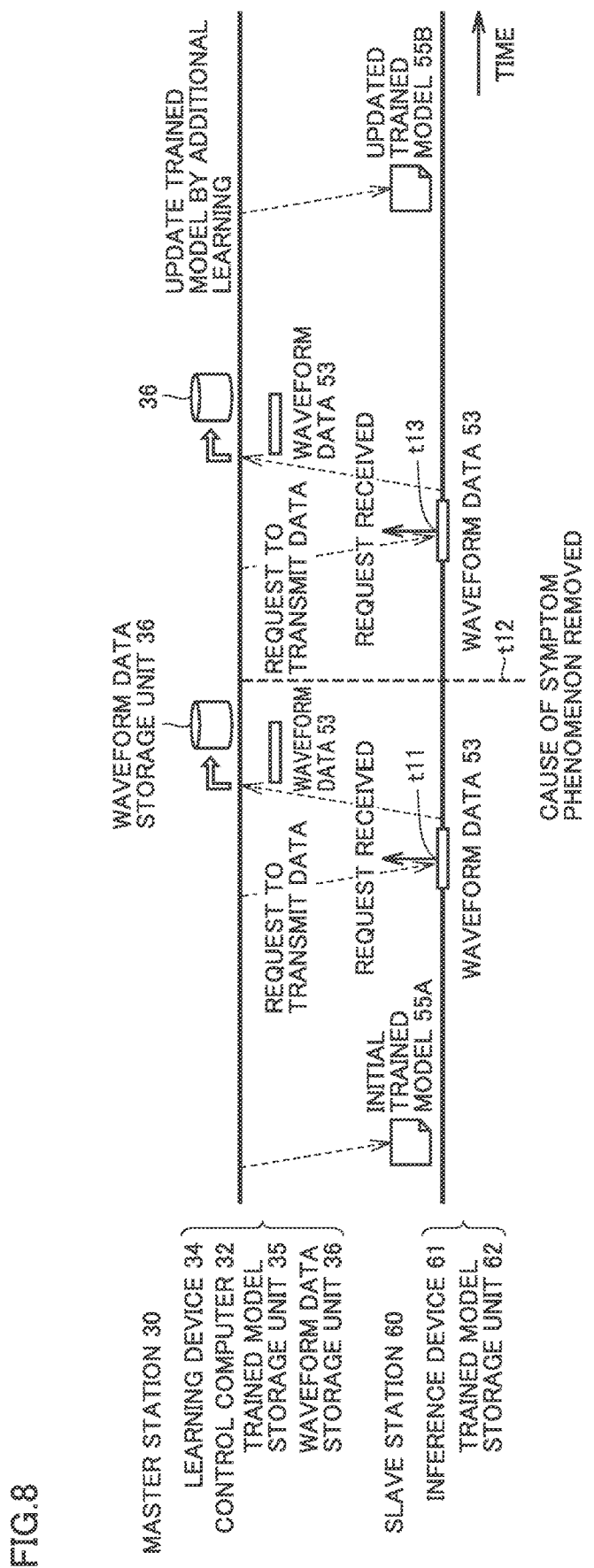
FIG. 8 is timing plots representing another example of the time-series operation of the master and slave stations.

FIG. 8 is timing plots representing another example of the time-series operation of the master and slave stations. In the example shown in FIG. 8, master station 30 can request at any timing that a designated slave station 60 transmit waveform data 53 measured in power distribution line 13. In that case, in response to the request received from master station 30 for transmission, slave station 60 transmits waveform data 53 of an electric amount measured in power distribution line 13 to master station 30 irrespective of an inference result provided by inference device 61.

Specifically, referring to FIG. 8, at a time t11 before a time t12 when a cause of a fault symptom is removed in a maintenance work performed by maintenance personnel, and at a time t13 alter time t12, slave station 60 receives a request from master station 30 to transmit waveform data 53. In response to the request from master station 30, slave station 60 transmits to master station 30 waveform data 53 and information associated therewith. Master station 30 receives waveform data 53 and the associated information and stores them to waveform data storage unit 36.

Herein, when there is a difference between one or more feature values of waveform data 53 received before and after time t12 when the cause 54 of the fault symptom is removed, master station 30 associates the cause 54 of the fault symptom with waveform data 53 received before time t12. Thus, a set of one or more feature values of waveform data 53 received by master station 30 before time t12 and the cause 54 of the fault symptom corresponding thereto can be included in additional training data. In that case, a set of one or more feature values of waveform data 53 received after time t12 and a result of a determination indicating that there is no indication of the fault symptom can further be included in the additional training data. The remainder in FIG. 8 is the same as in FIG. 7, and accordingly, will not be described repeatedly.

Further, when maintenance personnel perform periodical inspection, master station 30 may request slave station 60 that is provided at a location where there is no abnormality as a result of the periodical inspection to transmit waveform data 53 measured. Thus, master station 30 can collect waveform data 53 associated with a result of a determination indicating that there is no fault symptom.

(An Example of a Procedure of a Process by the Learning Device and the Inference Device)

Hereinafter, a procedure of a process by learning device 34 and inference device 61 will be described by summarizing the above description with reference to FIGS. 4, 9, and 10.

Figure 9:
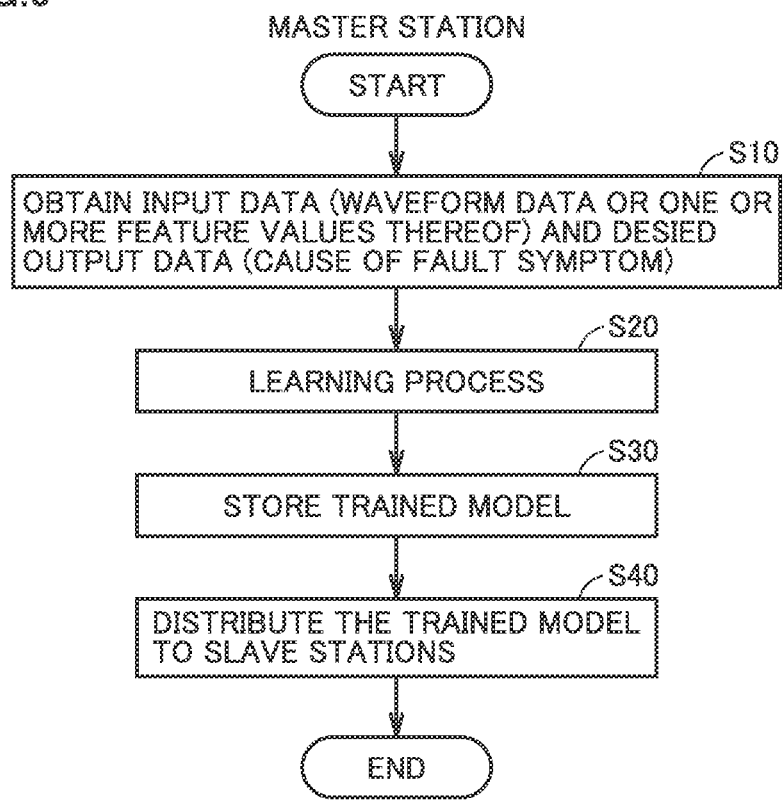
FIG. 9 is a flowchart of a procedure of a learning process performed by the learning device.
Figure 10:
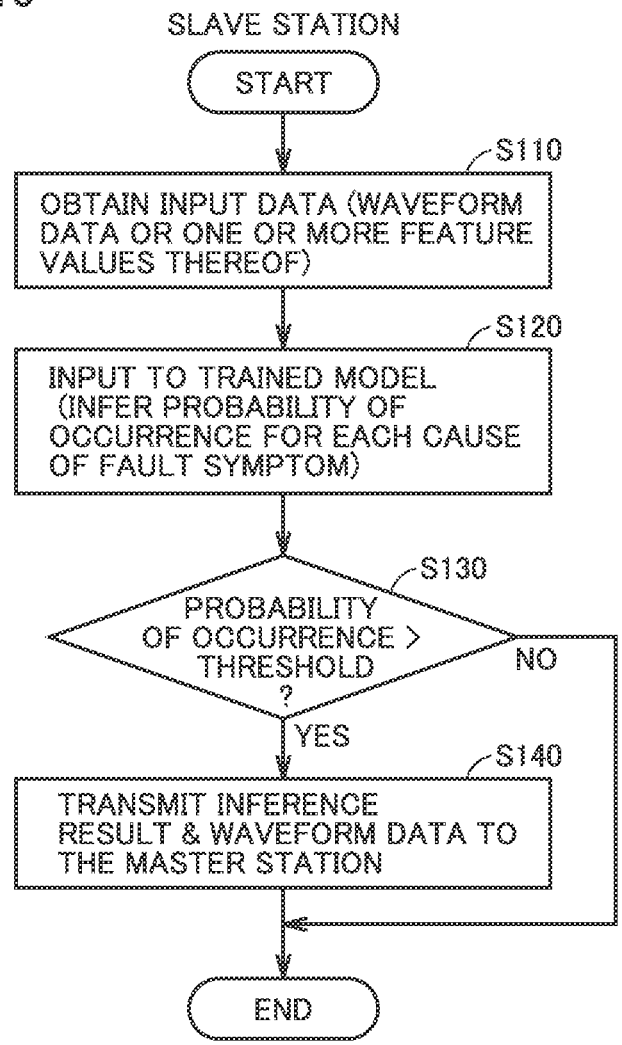
FIG. 10 is a flow chart of a procedure of an inference process performed by an inference device.

FIG. 9 is a flowchart of a procedure of a learning process performed by the learning device.

In step S10, data acquisition unit 51 acquires, as input data, waveform data 53 of an electric amount (e.g., waveform data composed of instantaneous value data of a zero-phase sequence voltage and a zero-phase sequence current) measured in power distribution line 13 or one or more feature values of waveform data 53. Further, data acquisition unit 51 acquires, as desired output data, the cause 54 of a fault symptom corresponding to waveform data 53.

It is sufficient that data acquisition unit 51 acquires both waveform data 53 or one or more feature values thereof and the cause 54 of the fault symptom in association with each other. Accordingly, data acquisition unit 51 may acquire waveform data 53 or one or more feature values thereof and the cause 54 of the fault symptom simultaneously or at different times.

In a subsequent step S20, model generation unit 52 learns the cause of the fault symptom through so-called supervised learning according to training data created based on a combination of waveform data 53 or one or more feature values thereof and the cause 54 of the fault symptom (i.e., a desired output) acquired by data acquisition unit 51, and generates trained model 55.

In a subsequent step S30 trained model storage unit 35 stores trained model 55 generated by model generation unit 52.

In step S40, master station 30 distributes to each slave station 60 trained model 55 generated by model generation unit 52. Either step S30 or step S40 may be performed first or the steps may be performed in parallel.

Hereinafter, a procedure of a process for obtaining a result of an inference of a cause of a fault symptom through inference device 61 will be described. FIG. 10 is a flowchart of a procedure of an inference process performed by the inference device.

In step S110, data acquisition unit 64 acquires, as input data, waveform data 53 of an electric amount (e.g., waveform data of an instantaneous value of a zero-phase sequence voltage and a zero-phase sequence current) measured in power distribution line 13 or one or more feature values of waveform data 53.

In a subsequent step S120, inference unit 65 inputs waveform data 53 or one or more feature values thereof to trained model 55 stored in trained model storage unit 62, and obtains a probability of occurrence for each cause of a fault symptom.

In a subsequent step S130, inference unit 65 determines whether any of probabilities of occurrence for causes of the fault symptoms exceeds a predetermined threshold. Note that when trained model 55 is updated, the threshold value may be changed to a value equal or higher than that before it is updated.

When a probability of occurrence of a cause of the fault symptom exceeds the threshold value (YES in step S130), inference unit 65 proceeds to step S140. In step S140, slave station 60 transmits to master station 30 inference result 66 (that is, the probability of occurrence of the cause of the fault symptom) and waveform data 53 corresponding thereto.

[Effect of First Embodiment]

As described above, fault symptom sensing system 2 of the first embodiment generates trained model 55 in learning device 34 of master station 30 based on a combination of waveform data 53 of an electric amount (e.g., waveform data of an instantaneous value of a zero-phase sequence current and a zero-phase sequence voltage) measured by each slave station 60 or one or more feature values of waveform data 53 and the cause 54 of a fault symptom corresponding thereto (that is, a desired output). Each slave station 60 senses a fault symptom based on trained model 55 distributed from master station 30. Thus, slave station 60 does not require high processing performance or large memory capacity as required by the computer of master station 30, and the cost of slave station 60 can be reduced.

Whenever each slave station 60 senses a fault symptom, slave station 60 transmits to master station 30 a result of an inference made by inference device 61, and, together therewith, waveform data 53 corresponding thereto. Master station 30 can subject trained model 55 to additional learning based on updating training data including waveform data 53 received from slave station 60 or one or more feature values of waveform data 53 and an actual cause 54 of the fault symptom corresponding thereto. Thus, updating training data can be collected efficiently, and a fault symptom can be sensed more accurately by using updated trained model 55B.

In addition, only when a fault symptom is sensed and when master station 30 issues a request, waveform data 53 is transmitted from each slave station 60 to master station 30, which can prevent communication line 21 from having increased traffic.

Second Embodiment

Fault symptom sensing system 2 according to a second embodiment predicts a period of time (or a number of days) elapsing since a fault symptom in power distribution line 13 is sensed in slave station 60 before the fault occurs. In order to be able to predict a period of time elapsing since a fault symptom is sensed before the fault occurs, additional training data different from that in the first embodiment is created. Hereinafter, this will be specifically described with reference to the drawings. The remainder of the second embodiment is substantially the same as the first embodiment, and accordingly, it will not be described repeatedly. The second embodiment can be combined with the first embodiment.

Figure 11:
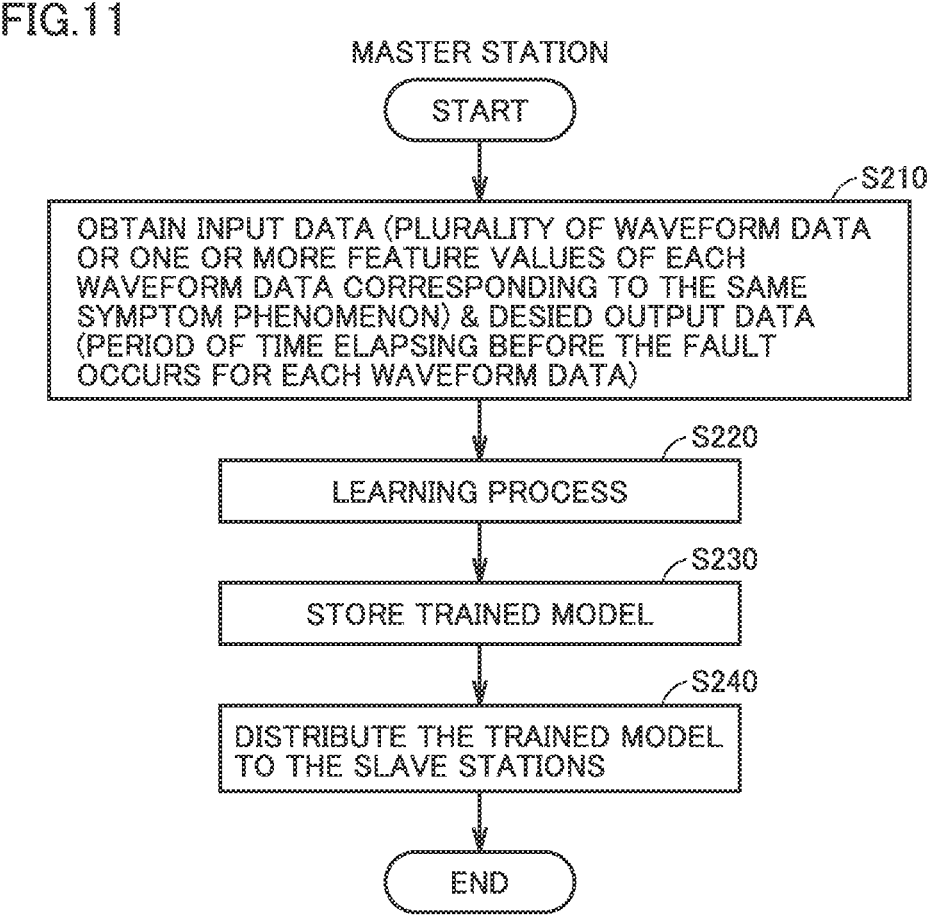
FIG. 11 is a flowchart of a procedure of a learning process performed by the learning device in a fault symptom sensing system according to a second embodiment.

FIG. 11 is a flow chart of a procedure of a learning process performed by the learning device in the fault symptom sensing system according to the second embodiment.

In step S210, data acquisition unit 51 acquires, as input data, a plurality of waveform data 53 (e.g., waveform data composed of instantaneous value data of a zero-phase sequence voltage and a zero-phase sequence current) measured in power distribution line 13 at a plurality of measurement times and corresponding to the same fault, or one or more feature values of each waveform data 53. Further, data acquisition unit 51 acquires, as desired output data, a period of time elapsing since each waveform data 53 is measured before the fault actually occurs.

In a subsequent step S220, through so-called supervised learning with training data created based on a combination of waveform data 53 including a fault symptom or one or more feature values of waveform data 53 and a period of time elapsing since the fault symptom before the fault occurs (that is, a desired output) as acquired by data acquisition unit 51, model generation unit 52 learns the period of time elapsing before the fault occurs, and thus generates trained model 55.

In a subsequent step S230, trained model storage unit 35 stores trained model 55 generated by model generation unit 52.

In a subsequent step S240, master station 30 distributes to each slave station 60 trained model 55 generated by model generation unit 52. Either step S230 or S240 may be performed first or the steps may be performed in parallel.

Figure 12:
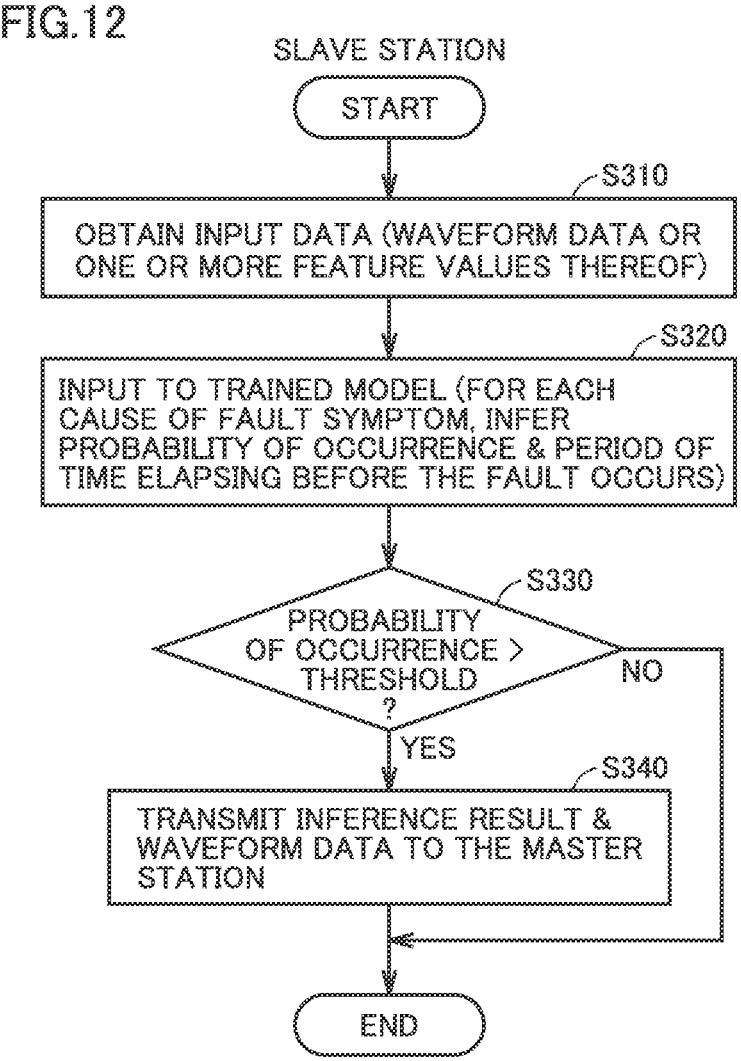
FIG. 12 is a flowchart of a procedure of an inference process performed by the inference device in the fault symptom sensing system according to the second embodiment.

Hereinafter will be described a procedure of a process for obtaining through inference device 61 an estimated value of a period of time elapsing since waveform data 53 including a fault symptom is measured before the fault actually occurs. FIG. 12 is a flowchart of a procedure of an inference process performed by the inference device in the fault symptom sensing system according to the second embodiment.

In step S310, data acquisition unit 64 acquires, as input data, waveform data 53 of an electric amount (e.g., waveform data composed of instantaneous value data of a zero-phase sequence voltage and a zero-phase sequence current) measured in power distribution line 13 or one or more feature values of waveform data 53.

In a subsequent step S320, inference unit 65 inputs waveform data 53 or one or more feature values thereof to trained models 55 stored in trained model storage unit 62. Trained models 55 in this case include both a trained model that infers a cause of a fault symptom, as has been described in the first embodiment, and a trained model that infers a period of time elapsing before a fault occurs, as described above. As a result, inference unit 65 obtains a probability of occurrence for each cause of a fault symptom, and a period of time elapsing before the fault occurs for each cause of the fault symptom.

In a subsequent step S330, inference unit 65 determines whether the probability of occurrence for each cause of the fault symptom exceeds a predetermined threshold. When the probability of occurrence for a cause of the fault symptom exceeds the threshold value (YES in step S330), inference unit 65 proceeds to step S340. In step S340, slave station 60 transmits to master station 30 inference result 66 (that is, the probability of occurrence for the cause of the fault symptom and an estimated value of the period of time elapsing before the fault occurs) and waveform data 53 corresponding thereto.

Thus, in addition to a function and effect of the first embodiment, fault symptom sensing system 2 of the second embodiment can provide an estimated value of a period of time (or a number of days) elapsing before a fault occurs. This allows an operator to know at a point in time before a fault occurs how a defective portion of power distribution line 13 is damaged.

Third Embodiment

For fault symptom sensing system 2 according to a third embodiment will be described a procedure of estimating a section having a high possibility of having a portion leading to a fault, based on inference result 66 received from each slave station 60. The hardware configuration of fault symptom sensing system 2 according to the third embodiment and the functional configuration of fault symptom sensing system 2 excluding the above-described function to estimate a section having a fault are similar to those in the first embodiment, and accordingly, will not be described repeatedly. The third embodiment can be combined with the first and/or second embodiments.

Figure 13:
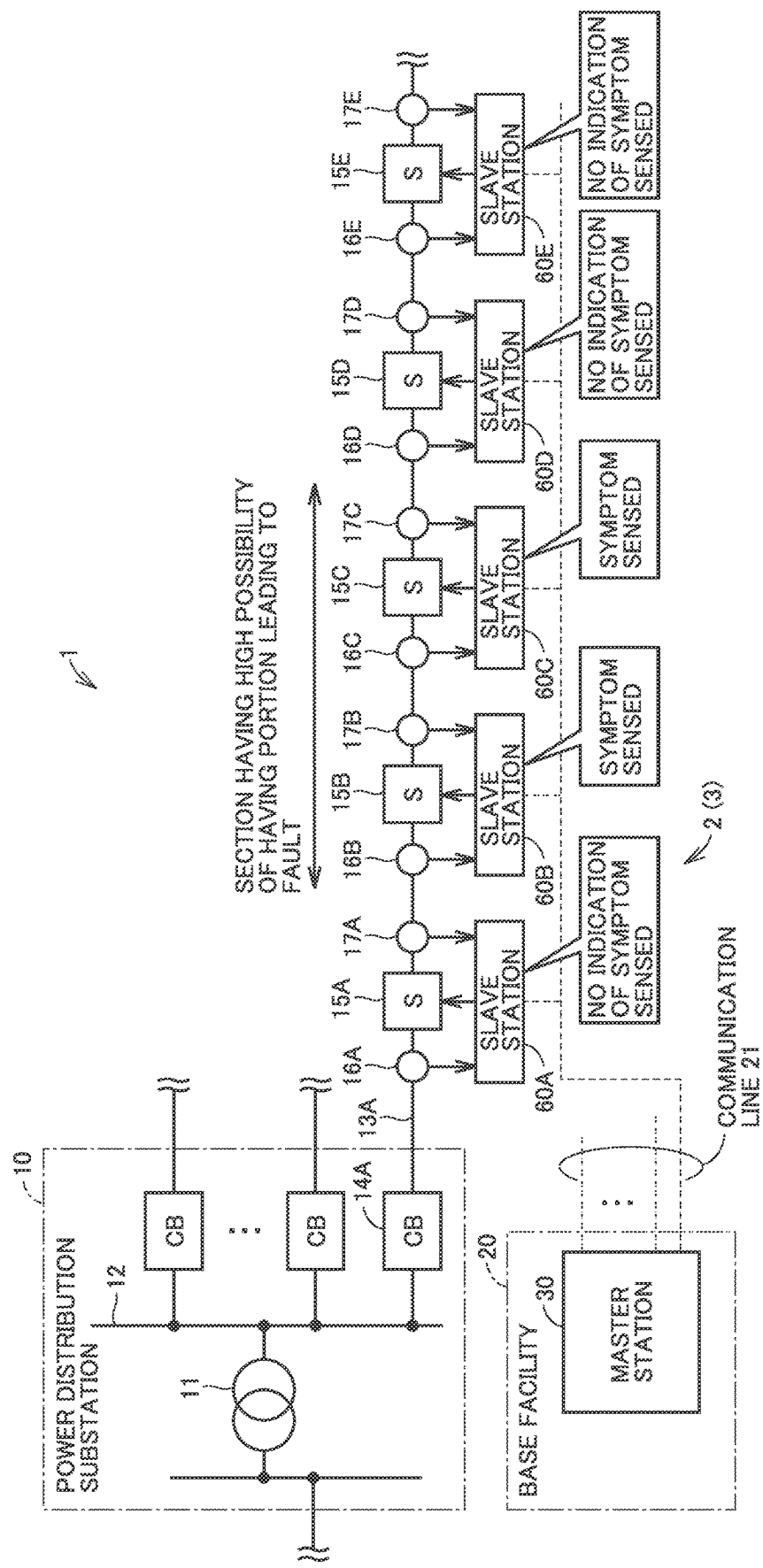
FIG. 13 is a diagram for illustrating a method in a fault symptom sensing system according to a third embodiment for estimating a section having a high possibility of having a portion leading to a fault.

FIG. 13 is a diagram for illustrating a method in a fault symptom sensing system according to the third embodiment for estimating a section having a high possibility of having a portion leading to a fault. The illustrative diagram of FIG. 13 corresponds to FIG. 1, and only a portion corresponding to a power distribution line 13A is described in detail.

As shown in FIG. 13, power distribution line 13A is provided with section switches 15A to 15E sequentially, as seen from a side closer to bus bar 12 and circuit breaker 14A. Transformers 16A to 16E, transformers 17A to 17E, and slave stations 60A to 60E are provided to correspond to section switches 15A to 15E, respectively.

Herein, slave stations 60B and 60C each transmit to master station 30 an inference result indicating that an identical cause 54 of a fault symptom is sensed, and slave stations 60A, 60D, and 60E do not sense any indication of the fault symptom for the sake of illustration. In that case, it is estimated that power distribution line 13A has a defect in a section between section switches 15B and 15C and in a vicinity of opposite sides of the section, that is, there is a high possibility of having a portion leading to a fault.

Further, when a phenomenon indicative of a slight ground fault is caused by a tree in contact with a power distribution line or the like, in which direction the ground fault current flows can be estimated from a phase difference between a zero-phase sequence voltage and a zero-phase sequence current. Thus, where a fault symptom occurs can be determined more accurately.

For example, a direction of a current of a ground fault as estimated from a phase difference between a zero-phase sequence voltage and a zero-phase sequence current detected by slave station 60B shown in FIG. 13 is a direction from section switch 15B toward section switch 15C for the sake of illustration. Further, a direction of a current of a ground fault as estimated front a phase difference between a zero-phase sequence voltage and a zero-phase sequence current detected by slave station 60C shown in FIG. 13 is a direction from section switch 15C toward section switch 15B for the sake of illustration. In that case, master station 30 can estimate that a phenomenon of a slight ground fault is caused in a section between section switches 15B and 15C.

FIG. 14 is a flowchart indicating an example of a procedure of estimating a section having a high possibility of having a portion leading to a fault. Referring to FIG. 14, when control computer 32 of master station 30 receives inference results 66 from a plurality of slave stations 60 (YES in step S410), control computer 32 proceeds to a subsequent step.

Subsequently, in step S420, control computer 32 determines whether an inference result indicating that a fault symptom of the same cause occurs is received from slave stations 60 adjacent to each other. When an inference result indicating that a fault symptom of the same cause occurs is not received (NO in step S420), control computer 32 ends the process.

In contrast, when control computer 32 receives from slave stations 60 adjacent to each other an inference result indicating that a fault symptom of the same cause occurs, control computer 32 determines that there is a high possibility of leading to the fault in a section of power distribution line 13 between those adjacent slave stations 60 due to the cause 54 of the fault symptom.

Thus, fault symptom sensing system 2 of the third embodiment allow s master station 30 to determine a section of power distribution line 13 having a high possibility of leading to a fault. This can contribute to increased efficiency of a maintenance work performed by maintenance personnel to search for a defective portion of power distribution line 13.

Fourth Embodiment

For fault symptom sensing system 2 according to a fourth embodiment will be described a specific example of a hardware configuration of slave station 60. The fourth embodiment can be combined with one or more of the first to third embodiments.

[Hardware Configuration of Slave Station]

FIG. 15 is a diagram showing an example of a hardware configuration of the slave station. Referring to FIG. 15, slave station 60 includes a CPU 70A, a filter 71A, an A/D converter 72A, a RAM 73A and a non-volatile memory 74A to function as a switch slave station of power distribution automation system 3, and a CPU 70B, a filter 71B, an A/D converter 72B, a RAM 73B and a non-volatile memory 74B to function as a slave station of fault symptom sensing system 2.

RAM 73A is used as a working memory for CPU 70A, and nonvolatile memory 74A stores a program executed by CPU 70A, data to be processed or having been processed by CPU 70A, and the like. Similarly, RAM 73B is used as a working memory of CPU 70B, and nonvolatile memory 74B stores a program executed by CPU 70B, data to be processed or having been processed by CPU 70B, and the like.

Further, slave station 60 includes an input converter 75 and a communication device 77 shared by fault symptom sensing system 2 and power distribution automation system 3, and an input/output interface (I/F) 76 located between section switch 15 and CPU 70A provided for power distribution automation system 3. Herein, input converter 75 performs level conversion of signals received from transformers 16 and 17. Communication device 77 communicates with master station 30 via communication line 21. Input/output interface 76 operates in response to a command received from CPU 70A to detect open/closed states of section switch 15 and output a command to open/close section switch 15. Input converter 75 and communication device 77 may be provided tor fault symptom sensing system 2 and power distribution automation system 3 individually.

CPU 70A receives current data and voltage data via input converter 75, filter 71A and A/D converter 72A sequentially, and receives information on open closed states of section switch 15 via input/output interface 76. Based on these inputs, CPU 70A calculates feature values such as an effective current value, effective voltage value, frequency, power and the like of a fundamental wave component in power distribution line 13, and performs calculation to determine whether power distribution line 13 has a fault.

CPU 70A transmits the calculated feature values of the fundamental wave component and the open/closed states of section switch 15 to master station 30. Further, in response to a command received from master station 30 to open/close section switch 15, CPU 70A outputs a signal to input/output interface 76 to open/close section switch 15.

A characteristic of filter 71A for power distribution automation system 3 and a sampling frequency of A/D converter 72A are set so as to be capable of extracting a fundamental wave component of a voltage and a current of power distribution line 13. Further, A/D converter 72A needs to measure a current and a voltage when power distribution line 13 has a fault. Therefore, A/D converter 72A has a full input scale determined such that a measurement signal corresponding to a current or a voltage having an amplitude of 20 to 40 times larger than that of a rated current or a rated voltage can be received.

CPU 70B receives current data and voltage data via input converter 75, filter 71B, and A/D converter 72B sequentially. CPU 70B uses the received data and trained model 55 to sense a fault symptom in power distribution line 13. When CPU 70B senses a fault symptom, CPU 70B notifies master station 30 of an estimated cause of the fault symptom, and transmits to master station 30 waveform data of a zero-phase sequence current and a zero-phase sequence voltage of a period of time including a point in time at which the fault symptom is sensed. Further, CPU 70B also transmits waveform data of a zero-phase sequence current and a zero-phase sequence voltage to master station 30 when CPU 70B receives a request from master station 30A to transmit data.

CPU 70B extracts a feature value by subjecting the waveform data of the zero-phase sequence current and the zero-phase sequence voltage to frequency analysis, waveform pattern recognition, and the like. Therefore, filter 71B needs to have a filter characteristic having a broader band than filter 71A, and A/D converter 72B needs to have a sampling frequency higher than A/D converter 72A. As it is necessary to accurately detect a fault symptom before the fault occurs. A/D converter 72B has a full input scale set to be capable of detecting a signal having an amplitude of about 1.5 times to 2 times larger than that of a rated current or a rated voltage. Therefore, CPU 70B can perform measurement with an accuracy 20 times higher than CPU 70A can.

When CPU 70B receives trained model 55 from master station 30, CPU 70B stores the received trained model 55 to nonvolatile memory 74B to update trained model 55.

A process performed by CPU 70A provided for power distribution automation system 3 is a process involved in measurement control required for operation of the power distribution line, and is required to present high real-time performance and reliability. Therefore, an embedded microcontroller is used as hardware of CPU 70A, and a real-time operating system (OS) is implemented. It is activated at a time in milliseconds in general.

When a speed of progression of a symptom leading to a fault is considered. CPU 70B for fault symptom sensing system 2 does not need any processing in milliseconds, and there is no problem even if the processing is performed once for a minute to one hour. Therefore, a general-purpose CPU is used as hardware of CPU 70B, and a general-purpose OS is implemented. Current data and voltage data for a predetermined period of time are accumulated in nonvolatile memory 74B and used to perform processing. In order to perform neural network processing based on trained model 55, CPU 70B requires high processing performance, and RAM 73B requires a large capacity.

[Effect of Fourth Embodiment]

According to the fourth embodiment, by separating the CPU 70A side used for power distribution automation system 3 and the CPU 70B side used for fault symptom sensing system 2, different filter characteristics, different sampling frequencies, different full input scales, different timings of execution of a calculation process, and different calculation periods can be provided. Therefore, processing performance and processing accuracy can be optimized based on a specification required for each of power distribution automation system 3 and fault symptom sensing system 2.

In addition, by separating the CPU 70A side used for power distribution automation system 3 from the CPU 70B side used for fault symptom sensing system 2, even if a problem arises in processing on the CPU 70B side used for fault symptom sensing system 2, the problem's effect on processing on the CPU 70A side used for power distribution automation system 3 can be minimized. Accordingly, slave station 60 having high reliability as a whole can be implemented.

While the present disclosure has been described in embodiments, it should be understood that the embodiments disclosed herein are illustrative and non-restrictive in any respect. The scope of the present disclosure is defined by the terms of the claims, and is intended to include any modifications within the meaning and scope equivalent to the terms of the claims.

What is claimed is:

1. A fault symptom sensing system comprising: a plurality of slave stations provided along a power distribution line; and a master station connected to the plurality of slave stations via a communication line, wherein
   the plurality of slave stations each include an inference device to infer whether a fault symptom occurs or not by inputting waveform data of an electric amount measured in the power distribution line or one or more feature values of the waveform data to a trained model generated from training data including waveform data of the electric amount indicating the fault symptom,
   the plurality of slave stations each transmit the measured waveform data to the master station when the inference device infers that the fault symptom occurs, the master station includes a learning device to generate the trained model, when the inference device of at least one of the slave stations infers that the fault symptom occurs and the power distribution line actually has a defect, the master station adds the waveform data received from the at least one slave station or one or more feature values of the waveform data to training data for updating the trained model,
   the learning device updates the trained model using the training data for updating, and distributes the updated trained model to the plurality of slave stations,
   the trained model is generated from training data including the waveform data of the electric amount indicating the fault symptom or the one or more feature values of the waveform data and a cause of the fault symptom,
   the training data further includes a combination of waveform data of the electric amount or one or more feature values of the waveform data when a zero-phase sequence current is generated in the power distribution line due to an operation of a power distribution system and/or variation in load, and a result of confirmation that there is no fault symptom,
   the inference device further infers a cause of a fault symptom in the power distribution line by inputting the waveform data of the electric amount measured in the power distribution line or the one or more feature values of the waveform data to the trained model,
   when the inference device infers that the fault symptom occurs, the plurality of slave stations each further transmit to the master station a result of an inference about a cause of the fault symptom, and
   when the inference device of at least one of the slave stations infers that the fault symptom occurs and a cause of the fault symptom is actually confirmed, the master station adds a combination of the waveform data received from the at least one slave station or the one or more feature values of the waveform data and the actually confirmed cause of the fault symptom to the training data for updating,
   the master station further includes a control computer to receive the result of the inference about the cause of the fault symptom, and
   when the control computer receives from each of two adjacent ones of the plurality of slave stations a result of an inference indicating that a fault symptom of an identical cause occurs, the control computer determines that there is a high possibility of leading to a fault in a section of the power distribution line between the two adjacent slave stations.

2. The fault symptom sensing system according to claim 1, wherein
   the inference device obtains an additional trained model generated from additional training data including a combination of the waveform data of the electric amount indicating the fault symptom or the one or more feature values of the waveform data and a period of time elapsing since the fault symptom occurs before a fault occurs,
   the inference device further infers a period of time elapsing before the fault occurs in the power distribution line by inputting the waveform data of the electric amount measured in the power distribution line or the one or more feature values of the waveform data to the additional trained model,
   when the inference device infers that the fault symptom occurs, the plurality of slave stations each transmit to the master station a result of an inference of a period of time elapsing before the fault occurs in the power distribution line, and
   when the fault symptom inferred by the inference device of at least one of the slave stations actually leads to occurrence of the fault, the master station adds a combination of the waveform data received from the at least one slave station or the one or more feature values of the waveform data and the period of time elapsing before the fault occurs in the power distribution line to training data for updating the additional trained model.

3. The fault symptom sensing system according to claim 1, wherein in response to a request received from the master station for transmission, the plurality of slave stations each transmit the waveform data of the electric amount measured in the power distribution line to the master station irrespective of a result of an inference provided by the inference device.

4. The fault symptom sensing system according to claim 1, wherein the master station and the plurality of slave stations of the fault symptom sensing system further function as a power distribution automating system.

5. The fault symptom sensing system according to claim 4, wherein the plurality of slave stations each include:
- a first filter to receive an output signal of a transformer provided to the power distribution line;
- a first analog/digital converter to generate first time-series data by converting the output signal into a digital value after the output signal passes through the first filter; a first processor to sense, using the first time-series data, whether a fault occurs in the power distribution line;
- a second filter to receive the output signal of the transformer provided to the power distribution line;
- a second analog/digital converter to generate second time-series data by converting the output signal into a digital value after the output signal passes through the second filter; and
- a second processor to perform an inference as the inference device, based on the waveform data of the electric amount as based on the second time-series data.

6. The fault symptom sensing system according to claim 5, wherein the second filter has a frequency band broader than the first filter does.

7. The fault symptom sensing system according to claim 5, wherein the second analog/digital converter has a sampling frequency higher than the first analog/digital converter does.

8. The fault symptom sensing system according to claim 5, wherein the second analog/digital converter has a smaller full scale for input than the first analog/digital converter does.

9. The fault symptom sensing system according to claim 1, wherein the waveform data of the electric amount includes waveform data of at least one of a zero-phase sequence voltage and a zero-phase sequence current.

10. A method for sensing a fault symptom in a power distribution line by a plurality of slave stations provided along the power distribution line and a master station connected to the plurality of slave stations via a communication line, the method comprising:
inferring, by each of the plurality of slave stations, whether a fault symptom occurs in the power distribution line by inputting waveform data of an electric amount measured in the power distribution line or one or more feature values of the waveform data to a trained model generated from training data including waveform data of the electric amount indicating the fault symptom, wherein the training data further includes a combination of waveform data of the electric amount or one or more feature values of the waveform data when a zero-phase sequence current is generated in the power distribution line due to an operation of a power distribution system and/or variation in load, and a result of confirmation that there is no fault symptom;
when at least one of the slave stations infers that the fault symptom occurs, transmitting, by the at least one of the slave stations, the measured waveform data to the master station; when at least one of the slave stations infers that the fault symptom occurs and the power distribution line actually has a defect, adding, by the master station, the waveform data received from the at least one slave station or one or more feature values of the waveform data to training data for updating the trained model; and
updating, by the master station, the trained model by using the training data for updating, and distributing the updated trained model to the plurality of slave stations, wherein the trained model is generated from training data including the waveform data of the electric amount indicating the fault symptom or the one or more feature values of the waveform data and a cause of the fault symptom,
the method further comprising:
inferring, by each of the plurality of slave stations, a cause of a fault symptom in the power distribution line by inputting to the trained model the waveform data of the electric amount measured in the power distribution line or the one or more feature values of the waveform data,
when at least one of the slave stations infers that the fault symptom occurs, transmitting, by the at least one of the slave stations, a result of an inference about a cause of the fault symptom to the master station,
when at least one of the slave stations infers that the fault symptom occurs and a cause of the fault symptom is actually confirmed, adding, by the master station, a combination of the waveform data received from the at least one slave station or the one or more feature values of the waveform data and the actually confirmed cause of the fault symptom to the training data for updating, and
when the master station receives from each of two adjacent slave stations of the plurality of slave stations a result of an inference indicating that a fault symptom of an identical cause occurs, determining, by the master station, that there is a high possibility of leading to a fault in a section of the power distribution line between the two adjacent slave stations.

11. The method for sensing the fault symptom according to claim 10, further comprising:
obtaining, by each of the plurality of slave stations, an additional trained model generated from additional training data including a combination of the waveform data of the electric amount indicating the fault symptom or the one or more feature values of the waveform data and a period of time elapsing since the fault symptom occurs before a fault occurs;
inferring, by each of the plurality of slave stations, a period of time elapsing before the fault occurs in the power distribution line by inputting the waveform data of the electric amount measured in the power distribution line or the one or more feature values of the waveform data to the additional trained model; when at least one of the slave stations infers that the fault symptom occurs, transmitting, by the at least one of the slave stations, to the master station a result of an inference of a period of time elapsing before the fault occurs in the power distribution line; and when the fault symptom inferred by at least one of the slave stations actually leads to occurrence of the fault, adding, by the master station, a combination of the waveform data received from the at least one slave station or the one or more feature values of the waveform data and the period of time elapsing before the fault occurs in the power distribution line to training data for updating the additional trained model.

12. The method for sensing the fault symptom according to claim 10, further comprising:

in response to a request received from the master station for transmission, transmitting, by each of the plurality of slave stations, the waveform data of the electric amount measured in the power distribution line to the master station irrespective of a result of the inferring.

* * * * *